Figure 5:
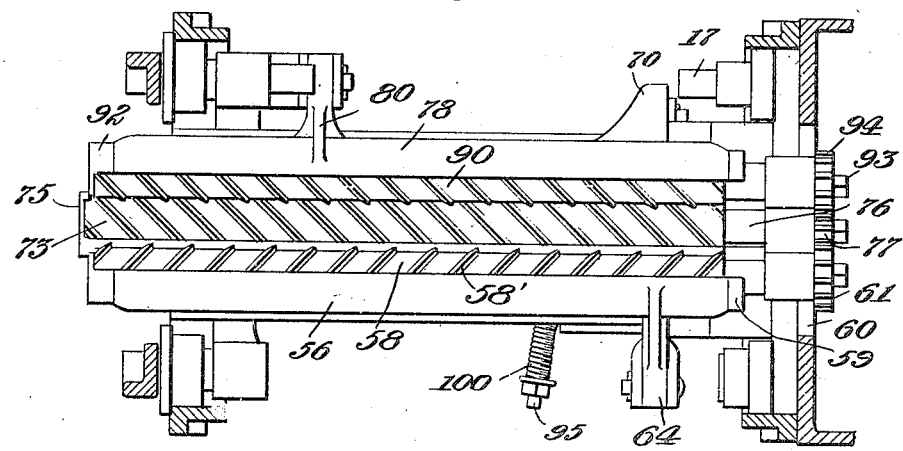

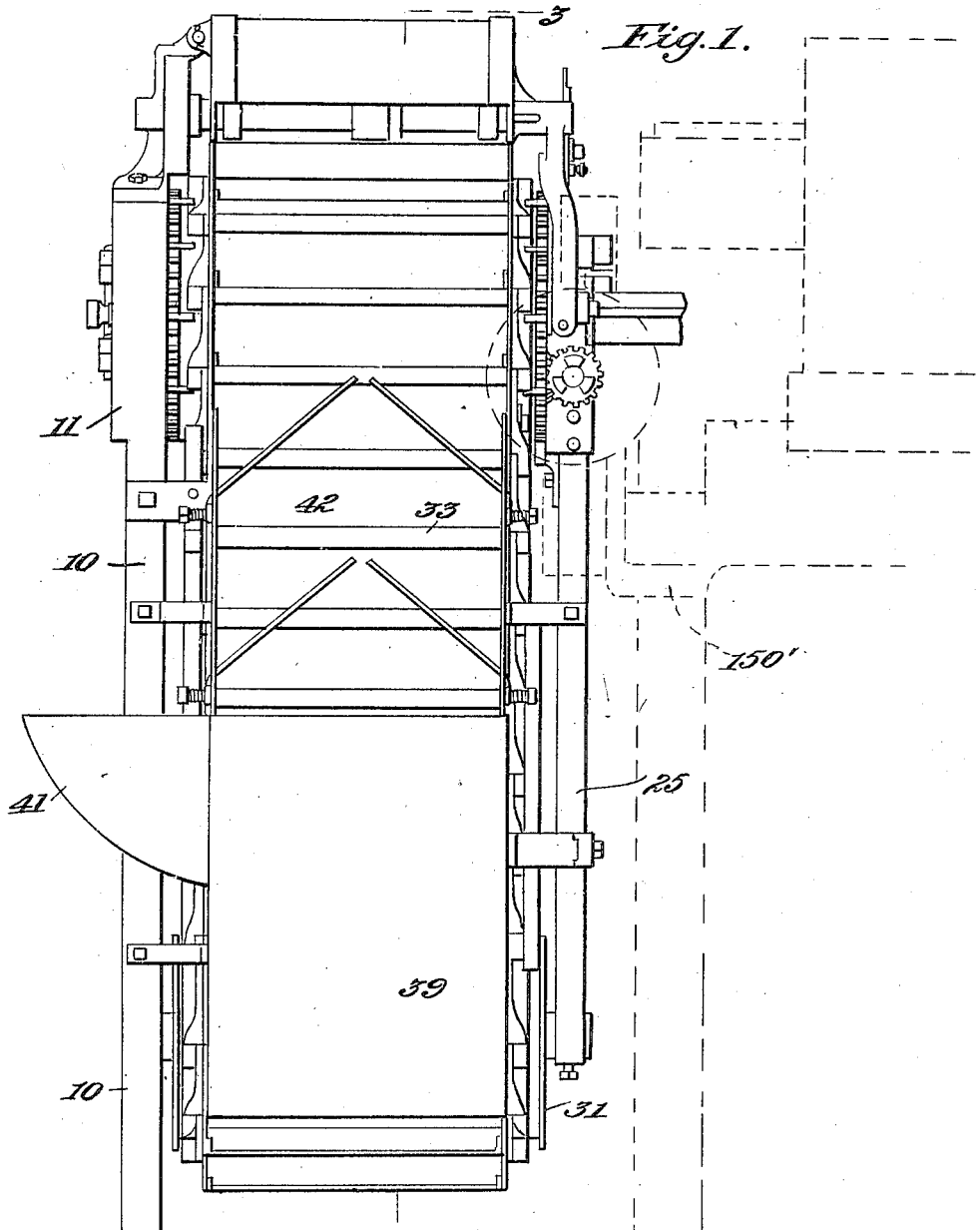

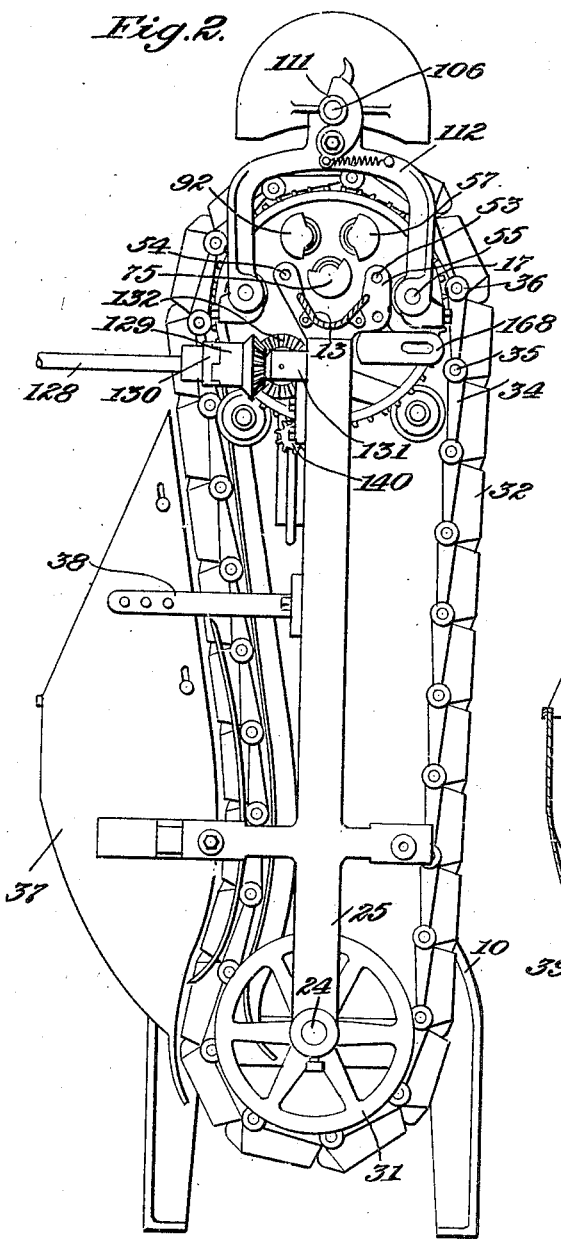

Apr. 17, 1923.
A. F. STERNAD
1,451,897
FEEDING MACHINE
Filed Oct. 25, 1921    10 sheets-sheet 3
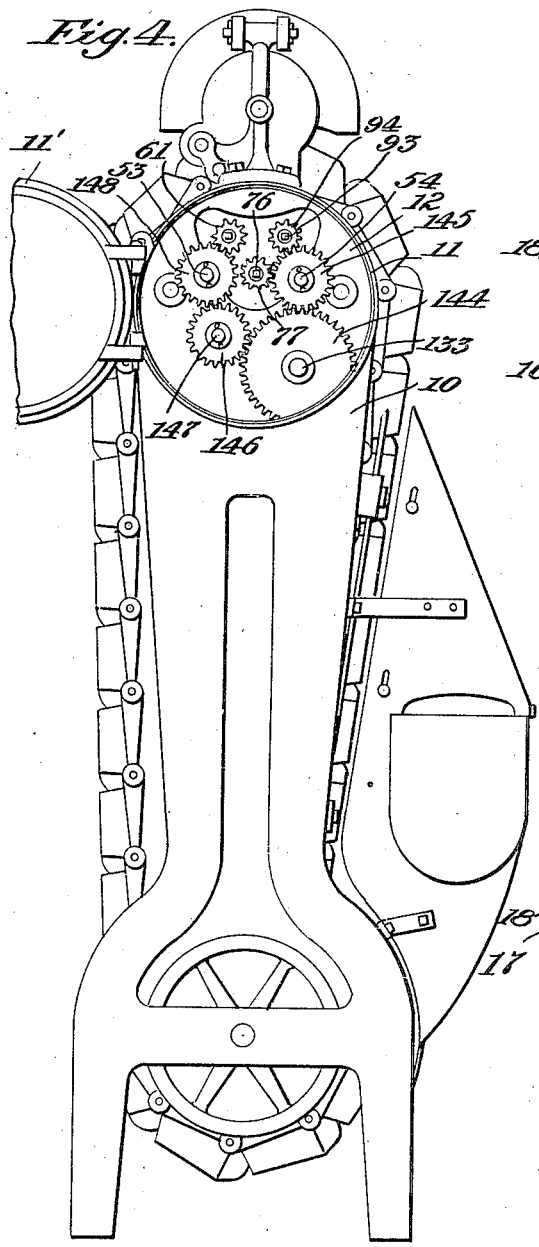
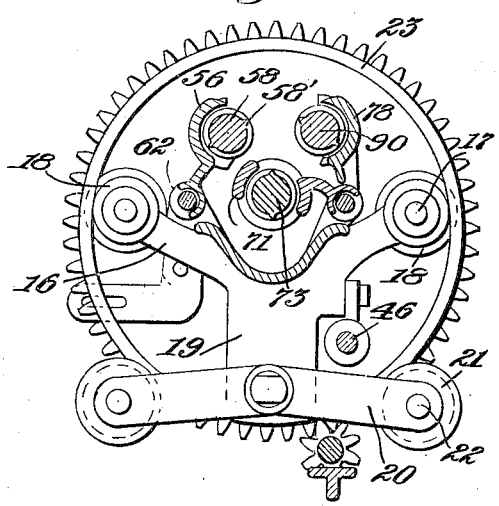
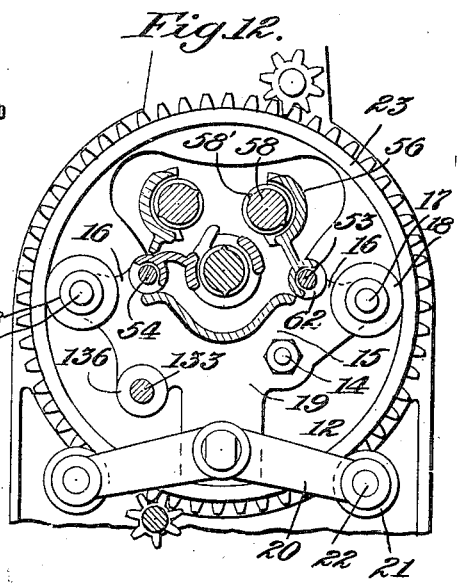
Inventor:
Andrew F. Sternad,
By Cushman, Bryant & Darby
Att'ys.

Apr. 17, 1923.  1,451,897

A. F. STERNAD

FEEDING MACHINE

Filed Oct. 25, 1921    10 sheets-sheet 4

Inventor:
Andrew F. Sternad,
By Cushman Bryant & Darby
Att'ys.

Apr. 17, 1923.

A. F. STERNAD 1,451,897

FEEDING MACHINE

Filed Oct. 25, 1921

10 sheets-sheet 5

Inventor:
Andrew F. Sternad,
By Cushman, Bryant & Darby
Att'ys.

Apr. 17, 1923.
A. F. STERNAD
1,451,897
FEEDING MACHINE
Filed Oct. 25, 1921
10 sheets-sheet 6
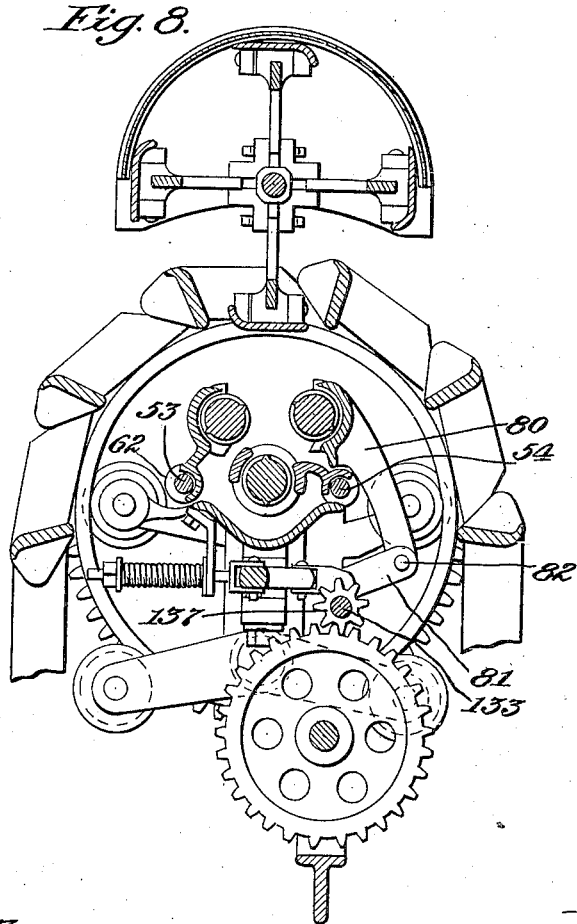
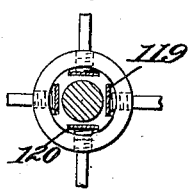
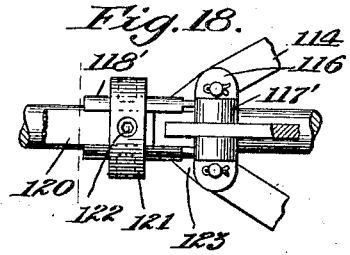
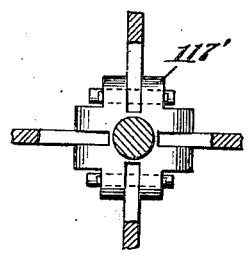
Inventor:
Andrew F. Sternad,
By Culman, Bryant & Darby
Att'ys.

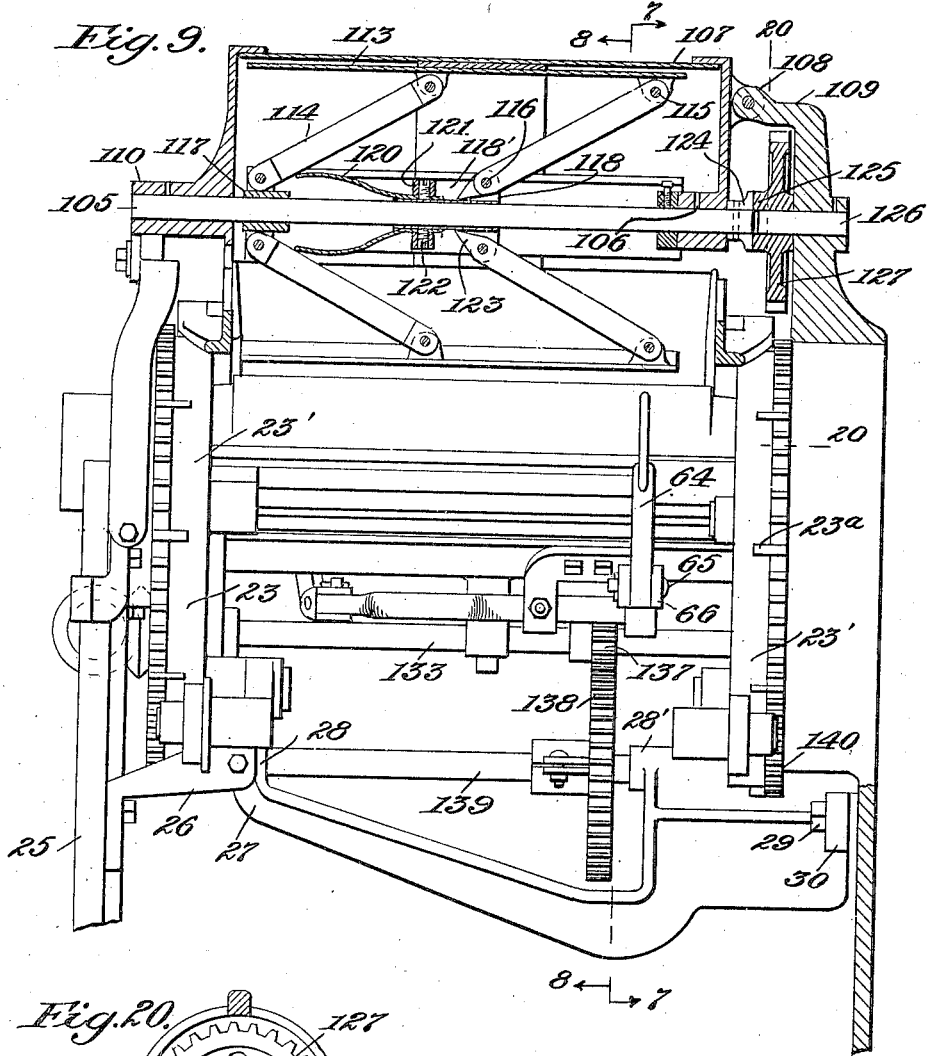

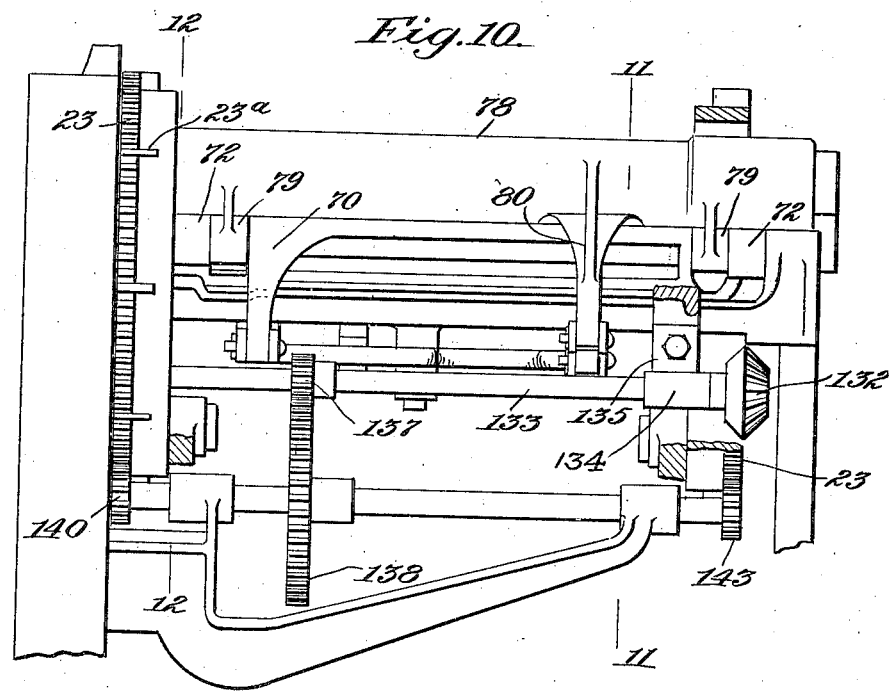

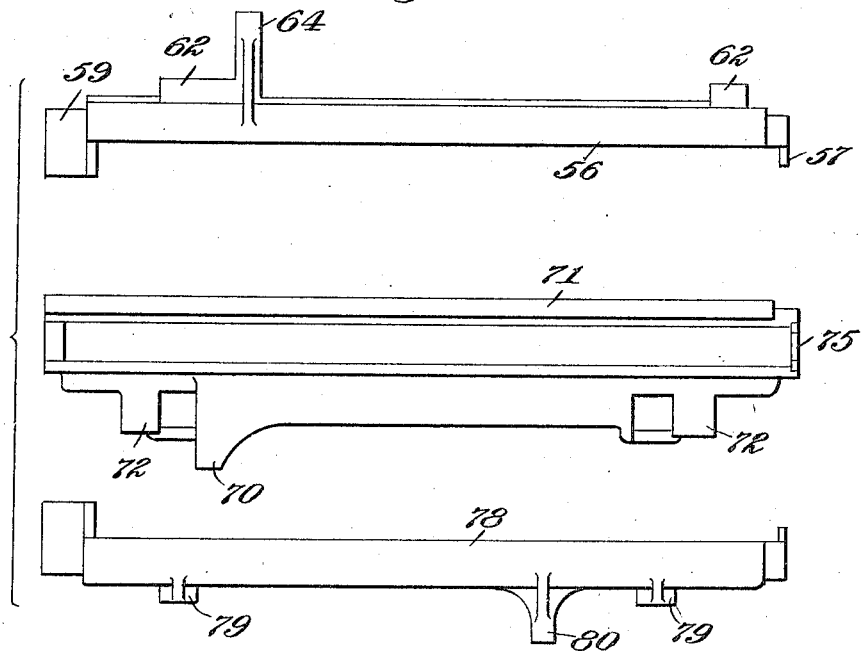
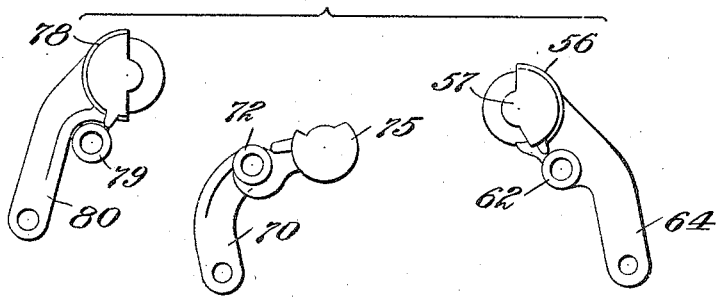

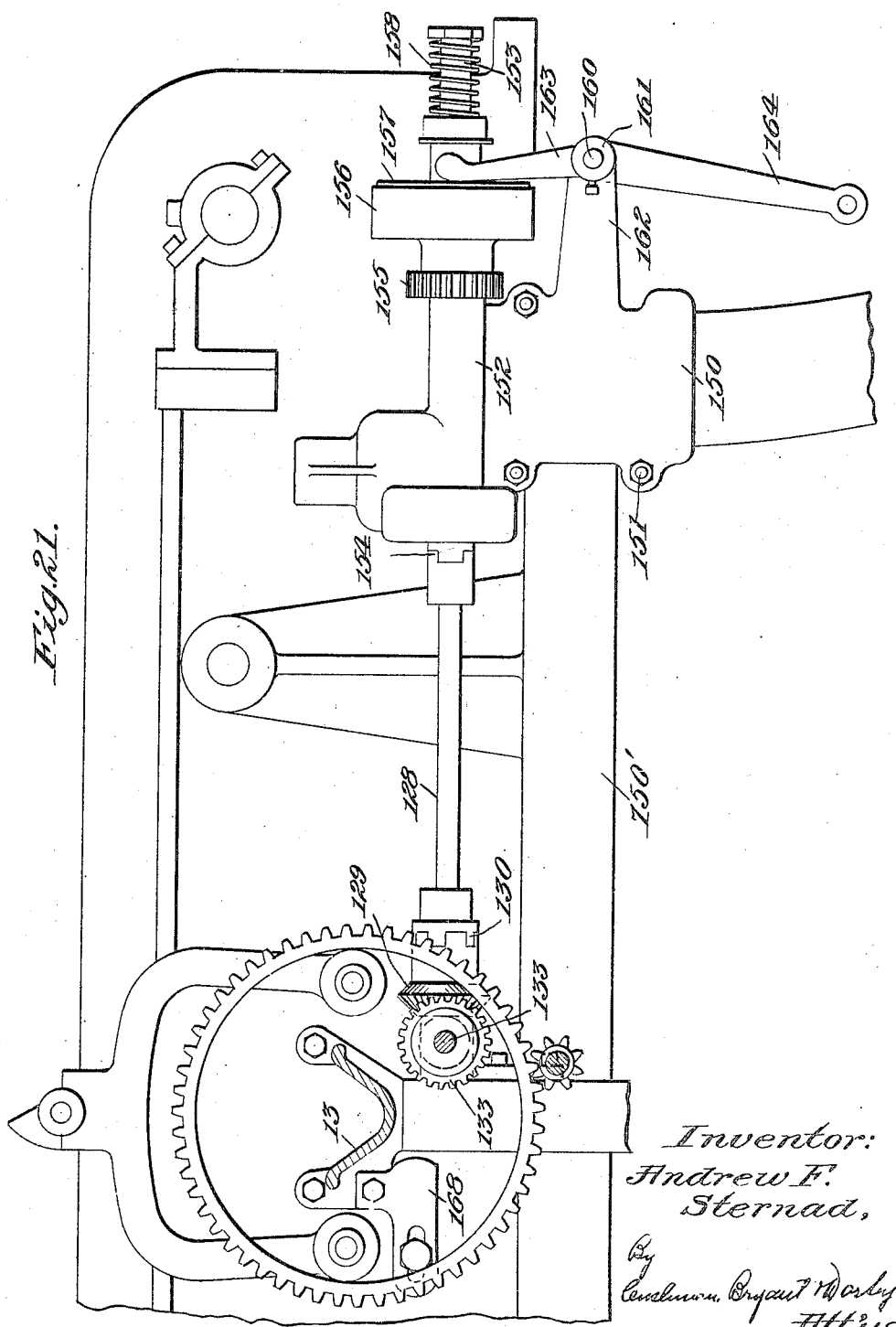

Patented Apr. 17, 1923.

1,451,897

UNITED STATES PATENT OFFICE.

ANDREW F. STERNAD, OF CHICAGO, ILLINOIS.

FEEDING MACHINE.

Application filed October 25, 1921. Serial No. 510,281.

*To all whom it may concern:*

Be it known that I, ANDREW F. STERNAD, a citizen of the United States, residing at Chicago, in the county of Cook and State of Illinois, have invented new and useful Improvements in Feeding Machines, of which the following is a specification.

This invention relates to machines for feeding ears of corn and the like, and is intended primarily, though not exclusively, for use in conjunction with corn cutting machines into which corn must be evenly and uniformly fed to cut the corn from the ear.

Before this invention it had been the practice manually to supply the ears of corn to the cutting machine, which, of course, involves the employment of a considerable amount of labor, particularly in large canning establishments where many of these machines are used. An objection to the manual feeding of these machines, in addition to the incidental expense, lies in the difficulty of keeping the cutting machine working at full capacity and of supplying it with ears of corn at an even rate in fixed ratio to the speed of the machine.

An object of the invention is to provide a machine which will automatically feed ears of corn and the like to a cutting machine with the ears uniformly arranged, preferably moving endwise, and at a speed in selected and unvarying ratio to the speed of the cutting machine.

Another object of the invention is the provision of means for stopping the feeder under defective operating conditions of the cutter, as when the cutting machine clogs.

Other objects of the invention are the provision of feeding means which may be readily applied to a cutting machine, will automatically conform to the size of the various ears of corn, and will supply the ears one at a time properly arranged and, irrespective of size, always to the center of the feed rollers on the cutter.

The above and various other objects of the invention which are of a more specific character and are more intimately associated with the detailed features of the embodiment of the invention shown in the drawings will become more obvious as the description proceeds.

In the drawings:—

Figure 6:
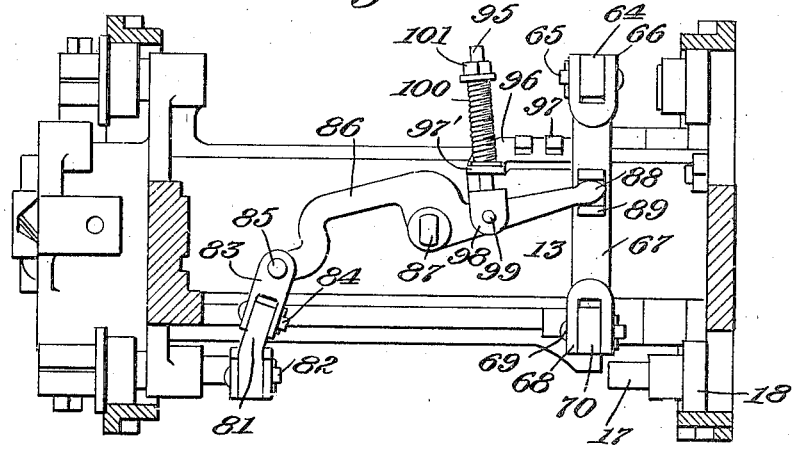
Figure 7:
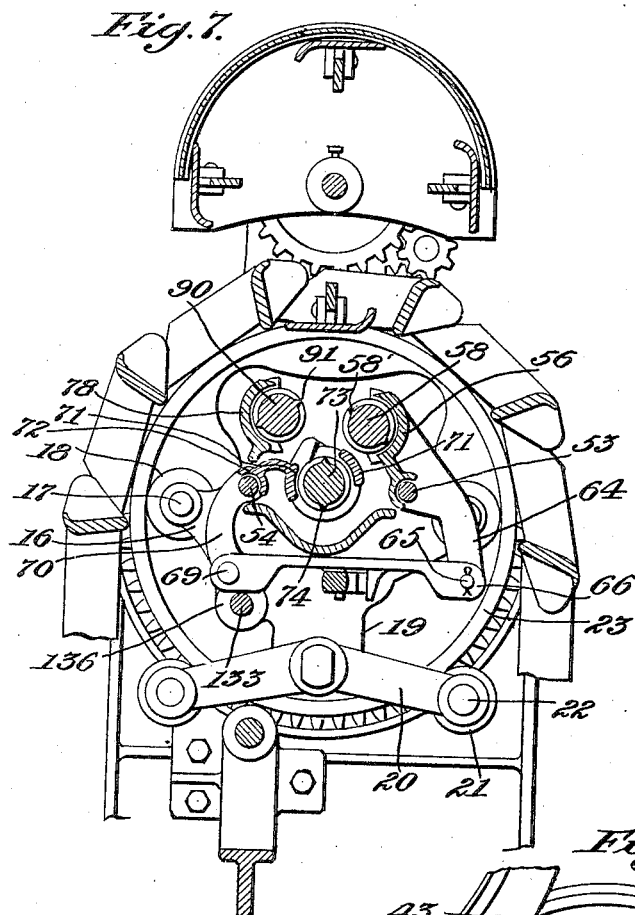
Figure 16:
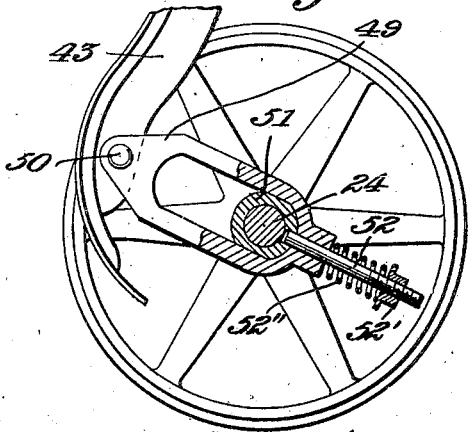
Figure 15:
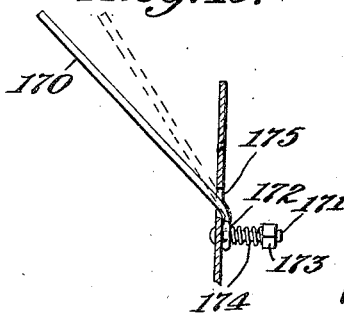

Fig. 1 is a front elevational view of the feeder showing in dotted lines a portion of a corn cutter to illustrate clearly the relation of the feeder to the cutter, Fig. 2 is an elevational view of the side of the machine adjacent the corn cutter, Fig. 3 is a vertical cross-sectional view on the line 3—3 of Fig. 1 looking in the direction of the corn cutter, Fig. 4 is an elevational view of the machine taken from the side furthermost removed from the corn cutter, Fig. 5 is a horizontal sectional view taken on a line beneath the transfer wheel, Fig. 6 is a bottom plan view of the portion of the device shown in Fig. 5, Fig. 7 is a vertical sectional view on the line 7—7 of Fig. 9 looking in the direction of the arrow, Fig. 8 is a vertical sectional view taken on the same line as Fig. 7 but looking toward the left of the machine, Fig. 9 is a rear elevational view of the upper portion of the device with the transfer wheel and adjacent mechanism shown partially in section, Fig. 10 is a front elevational view of the upper portion of the device with the transfer wheel and its casing removed, Fig. 11 is a vertical sectional view on the line 11—11 of Fig. 10 looking to the right, Fig. 12 is a vertical sectional view on the line 12—12 of Fig. 10 looking toward the left, Fig. 13 is a top plan view of the several housings for the secondary conveyor rollers showing the housings spaced apart but in their general operative relation, Fig. 14 is an end view of the housings shown in Fig. 13 looking toward the left and showings the housings in the same relation indicated in Fig. 13, Fig. 15 is a view of one of the fingers for removing additional ears which are carried by the conveyor from the hopper, Fig. 16 is a detail view of the support for the lower end of the apron forming the rear wall of the hopper, Figs. 17, 18 and 19 are detail views of the hub construction of the transfer wheel, Fig. 20 is a sectional view taken on the line 20—20 of Fig. 9, and Fig. 21 is a side elevational view of a corn cutting machine and including a portion of the conveyor driving mechanism upon the feeder to clearly illustrate the preferred form of drive for the feeder.

The foregoing objects of the invention are attained by the provision of a device which, broadly, comprises a hopper to which the ears of corn or other articles to be fed are supplied. The ears are removed from the hopper automatically and, preferably, one by one, by means of an endless traveling conveyor which may pass through the hopper. This conveyor carries the ears of corn to a second conveyor to which the ears are transferred by means of suitable transfer mechanism. The second conveyor should, preferably, be of such a type as will feed the ears endwise into the cutting machine, and may comprise a plurality of members adapted to hold the ear between them and be movable apart to conform to the cross-sectional size of the ear.

The entire device is driven in timed relation with the cutting machine, and may be driven through the cutting machine by mechanism which will cause the feeder to stop whenever the cutting machine clogs or whenever other defective operating conditions occur.

The above general description of the invention will be better understood in connection with the following detailed description of the embodiment of the invention illustrated in the accompanying drawings. Referring more particularly to Figs. 1, 4, 11 and 12, the entire mechanism is mounted upon a frame which comprisies a side standard or support 10 having at its upper end a casing 11 for the gearing, the casing having a door 11′ and a rear wall 12 which is formed integral with the standard. Secured to the wall 12, upon the exterior of the housing, is a trough 13 which is connected to the standard, as by means of bolts 14 (Fig. 12) passing through an end flange 15 upon the trough into the housing wall. At each end the trough has laterally extending ears 16 in which are fixedly mounted short shafts 17 which serve to receive rollers 18. Similarly, the trough has formed thereon at each end a downwardly extending ear 19 upon which is mounted a cross arm 20 having at its outer ends rollers 21 freely mounted upon stub shafts 22 fixedly secured in the ends of the cross arm. As will be noted the rollers 18 and 21 at each end of the trough serve as bearings for a ring gear 23, the rollers 18 being positioned upon the interior of the gear and the rollers 21 being located below and supporting the gear upon its circumference. Each gear has at one side of its teeth a plain outer peripheral surface portion 23′ which rides upon the rollers 21. A shaft 24 is fixedly mounted in the lower end of the standard 10 and extends outwardly therefrom to the opposite side of the machine into the lower end of a side bar which, at its upper end, is connected to the under face of the trough 13, and adjacent its upper end, is secured, as by means of an ear 26, (Fig. 9) to a bearing bracket 27. The bracket 27, adjacent the point of connection to the ear 26, has a bearing 28 and extends downwardly across the machine to the standard 10 where it is secured to the inner face of the standard as by means of bolts 29 passing through an end flange 30 into the standard. Upon the shaft 24 are rotatably mounted idler pulleys 31 which are traversed by an endless conveyor 32. The conveyor 32 (Figs. 2 and 3) comprises a plurality of flights or cross bars 33 connected together at each end by links 34, each link having at one end a stud or axle 35, and at its other end an eye 36 to receive the stud of the adjacent link. The conveyor traverses the pulley 31 and the ring gears 23 through which it is driven by mechanism later to be described.

The feeder is provided with a hopper 37 secured to the standard 10 and the side bar 25 by means of straps 38 connected to the sides of the hopper and to the standard and side bar. The hopper consists of a boot having a front wall 39 and side walls 40, an inlet chute 41 being formed in one side wall. The hopper is open at its upper end and is closed at its rear by means of an apron 42 slightly spaced from the side walls of the boot to afford a passage through the hopper for the conveyor. The apron has a vertical bracing or strengthening bar 43 (Fig. 3) connected at its upper end to a cross bar 44 formed with spaced hooks 45 adapted to fit over the inner ends of stub shafts 17 at each side of the machine. The apron is yieldingly held in position adjacent its bottom by means of a loop 48 (Figs. 3 and 16) extending around the shaft 24 and formed with a forked end 49 receiving the bar 43, a pin 50 passing through the fork and the bar. Within the loop and upon the shaft 24 is positioned a collar 51 (Fig. 16) which is flattened at spaced points on its circumference so as to be held against rotation within the loop. The loop is slidable rearwardly relatively to the shaft 24 and the collar 51, but is yieldingly held in the position illustrated in Figs. 3 and 16 by means of a pin 52 passing through the end of the loop into a recess within the collar, the end of the pin being fixedly held within the collar. A nut 52' upon the threaded end of the pin may be adjusted thereon to compress a spring 52" surrounding the pin. Obviously, rearward movement of the loop and the apron relatively to the collar 24 and the pin 52 will cause a compression of the spring 52", which will return the apron to its normal position when the force causing such movement has been removed. It is desirable that the apron be yieldable at its lower end so as to swing about the stud shafts 17, to which it is connected at its upper end, in the event that any ears of corn should become lodged between the apron and the conveyor.

The conveyor, as will be noted from an inspection of Figs. 1, 2 and 3, has a path of travel through the hopper, each flight or cross bar being adapted to take from the hopper a single ear and to carry the same upwardly. Adjacent the path of travel of the conveyor, and preferably within its closed path, is positioned a second conveyor for the purpose of receiving the ears singly from the first mentioned conveyor and imparting a feeding movement, preferably endwise, to the ear into the cutting machine. In this embodiment of the invention the second conveyor comprises a plurality of rollers formed with peripheral spiral ribs and adapted to relatively move apart, when the ear is inserted between them, in order to conform to the cross-sectional dimensions of the ear. Referring more particularly to Figs. 2, 3, 5, 7 and 8, a pair of spaced parallel rods 53, 54 extend through the wall 12 of the gearing housing 11 along the upper edge of the trough 13 to the opposite end of the trough where they are secured, as indicated in Fig. 2, in upwardly extending ears 55 in the end of the trough. Upon the rod 53 is pivotally mounted a semi-cylindrical housing 56 provided with an end cap 57 which affords a bearing for the axle of a roller 58 having a peripheral spiral rib 58'. The opposite end of the housing has a bearing 59 for the roller axle, the axle being extended at this end through an opening 60 in the gear housing wall to fixedly receive a pinion 61. The housing 56 (Figs. 12 and 13) has formed thereon at each end, an ear 62 through which passes the rod 53, thereby affording bearings for the housing in its pivotal movement about the rod. The bearing ear adjacent the gear housing is extended outwardly and downwardly to form an arm 64 pivotally connected by means of a pin 65 to the forked end 66 of a link 67, the pin passing through the fork and the arm 64. The opposite end of the link 67 is similarly forked, as at 68 (Fig. 6) and is pivotally connected by means of a pin 69 to the end of an arm 70 extending downwardly (Figs. 5 and 7) from a housing 71 positioned below the housing 56 and pivotally mounted upon the rod 54 by means of spaced ears 72 (Figs. 13 and 14) through which the rod 53 extends. Within the housing 71 is mounted a roller 73 provided with a peripheral spiral rib 74 and having a bearing at one end in a cap 75 of the housing and at the other end (Figs. 4 and 5) having its axle 76 passing through the opening 60 in the gearing housing for the reception of a pinion 77. Slightly above and to one side of the roller 73 and its housing is pivotally mounted a third housing 78 which is substantially semi-cylindrical in cross section, and is pivotally mounted upon the shaft 54 by means of ears 79 (Figs. 10, 13 and 14) through which the shaft extends. Adjacent one end (Fig. 8) the housing 78 has an outwardly and downwardly extending arm 80 pivotally connected at its free end to a link 81 by means of a pin 82, the link being connected (Fig. 6) to a second link 83 by a pin 84 to form a universal joint. The free end of the link 83 is forked and is pivotally secured, as by a pin 85, to the free end of a lever 86 fulcrumed at 87 to the under face of the trough 13. The other end 88 of the lever 86 extends between a pair of spaced lugs 89 at an intermediate point on the link 67 connecting the downwardly extending arms of the housings 56 and 72. Within the housing 78 is mounted a spirally ribbed roller 90 having bearings in the end cap 92 of the housing and in the opposite end of the housing through which its axle 93 extends into the gear casing upon the standard 10 to receive a pinion 94 fixedly secured to the axle.

It will be seen that by the above described chain of links and levers the three housings 56, 72 and 78 are all connected so that movement of one housing and its roller is transmitted to the other two housings and their rollers. The rollers are slightly spaced apart so as to receive between them an ear of corn, and when the ear is placed between the rollers they move apart to conform to the cross-sectional size of the ear, the connection between the housing being such that all of the rollers will move an equal distance from their normal position shown in the several views. When an ear of corn is placed between the several rollers the two upper rollers 58 and 90 will move upwardly and outwardly, their housings moving about the shafts 53 and 45. At the same time the lower roller 73 and its housing will move downwardly about the shaft 54 due to the lever connection with the housing 56 of the roller 58, above described.

The rollers and their housings are normally maintained in the position shown in the several views by means of a plunger 95 (Fig. 6) having a reciprocating movement in the end of a bracket 96 secured at 97 to the under face of the trough 13, the bracket having a downwardly extending portion 97′ through which the plunger extends, and by which the plunger is supported. At one end the plunger is forked, as indicated at 98, and is pivotally connected by means of a pin 99 to the lever 86. A spring 100 upon the plunger abuts the portion 97′ of the bracket and is normally held compressed by means of a nut 101 threaded upon the plunger. When the several conveyor rollers and their housings move apart the lever 86 swings about its fulcrum in a clockwise direction, as viewed in bottom plan in Fig. 6, thus further compressing the spring, which, obviously, serves to return the rollers and their housings to their normal position as soon as the ear of corn or other article which causes them to move apart is fed into the cutting machine or other device associated with the feeder.

From the above description it will be understood that as the endless conveyor travels upwardly through the hopper the ears of corn are removed from the hopper, each flight of the conveyor carrying a single ear, and are carried to a point above the secondary conveyor, which comprises the several spirally ribbed rollers above described. At this point the ears are, one at a time, transferred to the second conveyor, suitable transfer mechanism being provided to press the ear between the several rollers to be firmly gripped thereby.

In the illustrated embodiment of the invention this transfer mechanism comprises a wheel 103 (Figs. 3 and 9) fixedly mounted upon a shaft 105 having bearings 106 in the ends of a substantially semi-cylindrical housing 107. This housing is hingedly connected, as at 108, to an upwardly extending ear 109 on the upper part of the standard 10, and at its free end has a cylindrical extension 110, which, when the housing and transfer wheel are swung downwardly to operative position, as shown in Figs. 2 and 3, is engaged by a spring operated latch 111 pivotally mounted upon a yoke 112 supported upon the outer ends of the studs or axles 17.

The hub of the transfer wheel carries a plurality of yielding presser bars 113 extending parallel to the shaft 105 and located at circumferentially spaced points about the hub 104. Each presser bar is supported in spaced relation to the hub, so as to be movable to and from the latter, by means of arms 114 pivotally connected to the presser bars, as at 115 and to the hub at 116. The hub of the wheel comprises (Figs. 9, 17, 18 and 19) spaced collars 117, 118, each having pairs of spaced lugs 117′ between which the arms 114 are pivotally secured, and the collar 118 having an extension 118′ provided with a plurality of grooves 119 in which are anchored the ends of leaf springs 120 by means of a collar 121 having set screws 122 passing therethrough and engaging the individual springs. The other ends of the springs are outwardly bowed to engage the respective arms 114 (Fig. 9), and thereby to hold the presser bars in position furthermost removed from the hub of the wheel. The outward movement of the presser bars under the influence of these springs may be limited as by extending inwardly the ends of the arms 114 past their pivotal connections 116 so that they engage the collar extension 118′, as indicated at 123. It will be understood that this wheel moves in synchronism with the traveling conveyor, and in order that movement may be imparted to the shaft 106 the same has affixed thereon at its end adjacent the standard 10 a clutch portion 124 adapted to engage a complemental clutch portion 125 affixed to a short shaft 126 mounted in the upper end of the standard 10, the latter mentioned shaft having fixedly secured thereon a spur gear 127.

Motion is transmitted from any suitable source of power, preferably from the cutting machine, through a shaft 128 (Figs. 2 and 21), which, through a clutch 130, drives a bevel gear 129 mounted upon a short shaft having a bearing in a bracket 131 which is mounted on the upper end of the side bar 25. The gear 129 meshes with a bevel gear 132 upon a shaft 133 (Fig. 10) which has a bearing 134 in a bracket 135 secured to the under face of the trough 13, and at its opposite end (Figs. 1 and 12) has a bearing 136 in the trough flange and the wall of the gear casing 11. As will be noted from an insection of Figs. 9 and 10, the shaft 133 has affixed thereto beneath the trough 13 a spur gear 137 in mesh with a spur gear 138 secured to a counter shaft 139 supported in the bearing 28 of the bracket 27 and in a bearing 28′ at the opposite end of the same bracket. At its ends the shaft 139 is provided with spur gears 140 (Fig. 10) meshing with the ring gears 23. It will be noted that the ring gears are at circumferentially spaced points provided with elongated teeth 23ª which engage the links of the conveyor and thus transmit motion to the latter. To assume, it will be obvious that movement is imparted to the conveyor from the shaft 128 through bevel gears 129, 132, shaft 133, spur gears 137, 138, shaft 139, pinion 140 upon the ends of the shaft 139 and ring gears 133.

The transfer wheel may be driven from the ring gear 23 adjacent the standard 10 through pinions 141, 142 (Fig. 20) mounted upon stub shafts 143 in the upper end of the standard 10, the pinion 142 being in mesh with the gear 127.

Referring more particularly to Figs. 4 and 5, the drive for the secondary conveyor and the several rollers thereof will now be described. It will be noted that the shaft 133 extends into the gear casing 11 and has affixed thereto a gear 144. The gear 144 meshes with a pinion 145 loosely mounted upon the end of the rod 54. The pinion 145 drives the gear 77 fixedly secured to the axle of the bottom conveyor roller 73 and the gear 94 fixedly secured to the shaft 93 of the conveyor roller 90. The gear 61 upon the shaft of the roller 58 is also driven from gear 144 through an idler gear 146 loosely mounted upon a stub shaft 147 and meshing with a gear 148 freely mounted upon the end of rod 53.

It will be recalled, by referring to Figs. 2 and 3 and the description thereof, that the centers of oscillation or pivotal movement of the several conveyor rollers are the rods 53 and 54, and since the several gears 61, 77 and 94 on the axles of these rollers are driven from the gears upon the ends of the same rods, the driving relation between the gear 61 and the gear 148 and between the gears 77 and 94 and the gear 145 is not interrupted when the rollers are moved apart by an ear of corn. When an ear of corn is placed between the conveyor rollers by the transfer wheel the gear 94 upon the end of shaft 93 of the conveyor roller 90 will have a planetary movement in a clockwise direction around the gear 145, with the rod 54 as a center of its planetary movement. Similarly, the gear 77 will move in a counter-clockwise direction and the gear 61 will move about the gear 148 in a counter-clockwise direction.

As stated above, power is supplied to the machine preferably from the cutter, and in Fig. 21 there is shown a clutch construction comprising a stop mechanism which may be used so that whenever the cutter becomes clogged the operation of the feeder is automatically stopped.

The clutch comprises a bracket 150 which may be secured to the frame 150' of the cutting machine, as by bolts 151. The cutting machine to which this feeder and cutting mechanism is applied may be of any suitable type, preferably one into which the corn is fed endwise, such a machine being shown in the patent to J. M. C. Jones No. 1,090,988, Mar. 24, 1914. Mounted in a bearing 152 formed upon the bracket is a shaft 153 having at one end a clutch portion 154 adapted to engage a complemental clutch portion upon the end of a short shaft 128, a portion of which is shown in Fig. 2. At the other end of the bearing the shaft has loosely mounted thereon a spur gear 155 driven from the cutter by suitable gearing (not shown) and connected to a clutch section 156. The complemental clutch portion 157 is slidably keyed to the shaft and is normally urged within the clutch section 156 by means of a spring 158. The clutch portions 156 and 157 are to be thrown out of engagement automatically whenever the cutting machine clogs or other defective operating conditions occur, and this may be accomplished by means of a rock shaft 160 having a bearing 161 in an extension arm 162 of the bracket 150 and formed with an upwardly extending forked arm 163 in engagement with the clutch section 157. The shaft 160 has connected thereto at its other end a downwardly extending arm 164 which, through suitable mechanism (not shown) is connected to the cutter stop. From the above description it will be obvious that whenever the cutter stop mechanism is thrown into operation the clutch portions 156 and 157 will be thrown out of engagement and movement imparted to the clutch portion 156 through the gear, to which it is connected, will result merely in the idle rotation of this clutch portion about its shaft without the transmission of its movement to the feeding machine.

The entire mechanism above described may be coupled to the cutting machine, as shown in Fig. 1, and by means of an ear 168 extending laterally from the side bar 25 (Fig. 2) a bolt or other suitable connecting device being passed through the opening in the gear 168 into the frame of the cutting machine.

In order to prevent the removal from the hopper of more than a single ear of corn at a time by each flight of the endless conveyor it is desirable that some means be provided to disengage from the flights any additional ears that may be caught up by them as the conveyor passes through the hopper. Referring more particularly to Figs. 2, 3 and 15 there are mounted in each side wall 40 of the hopper a plurality of fingers 170 extending upwardly across the face of the conveyor. Each finger, which may be formed of a short length of wire or other suitable material, is mounted upon the outside of the hopper upon a pin 171 which extends through a loop 172 formed at the end of the finger, a nut 173 and compression spring 174 being placed upon the stud to hold the finger in proper position. Each finger has its loop formed somewhat larger than the pin upon which it is mounted to permit the finger to rock about the pin, and extends through an opening 175 in the side wall of the hopper, which, also, is of a size to permit the finger to swing upwardly if engaged by material being carried by the conveyor, the movement of the fingers being an upward rocking movement in a vertical plane at their point of connection to the pins 171, as indicated by the dotted lines in Fig. 15. Each flight of the conveyor is of just sufficient width to carry but a single ear of corn without having the ear project outwardly into the path of the fingers 170. If more than one ear is carried upwardly by a flight the second ear will project into the path of the fingers and as the conveyor moves upwardly will be engaged by the fingers and wiped from the conveyor. At this point it may be observed that just above the base of the hopper the conveyor moves slightly inwardly toward the rear of the machine, taking an inwardly curved path. At a point just below the fingers the conveyor moves in a path forwardly inclined from the vertical thus materially assisting the fingers in knocking off the conveyor additional ears that may be carried.

As the conveyor moves upwardly carrying on each flight a single ear of corn, the ears are, one at a time presented to the second conveyor and are pressed between the rollers in this conveyor by means of the presser bars of the transfer wheel, which, it will be recalled, is being rotated in synchronism with the traveling conveyor mechanism. The movement of the traveling conveyor is so timed in relation to the transfer wheel that a presser bar of the wheel will be presented at each opening between the flights of the conveyor as the ears of corn are carried upwardly. It should be observed that the clutch connection 124, 125 of the transfer wheel shaft is of a character that driving relation between the wall shaft and the driving shaft 126 may be established only when the wheel is turned so that one of the presser bars is positioned between a pair of traveling conveyor flights. This arrangement insures against improper timing of the relation between the movement of the traveling conveyor and the transfer wheel.

As the ears of corn are singly moved between the rotating rollers of the secondary conveyor the rollers and their housings are relatively moved apart against the tension of their return plunger and spring 95 and 100 (Fig. 6) to conform to the cross sectional size of the ears. Due to the tension of the spring 100 the rollers yieldingly grip between them the ears, and as they are rotated impart to the ears an endwise movement relatively to the rollers into the cutting machine, the movement being caused, of course, by the peripheral spiral ribs upon the rollers. Due to the gripping of the ears by the rollers of the second conveyor there may be some juice squeezed from the ears by the pressure of the rollers; the trough 13 serves to catch this juice and conduct the same through its open end above the side bar 25 into the cutting machine. After an ear of corn has been received by the second conveyor and fed into the cutting machine the rollers and their housings are automatically returned to their normal position shown in the several views by the return spring 100, and immediately receive another ear from the succeeding flight of the traveling conveyor.

It should be observed that the construction of this machine is such that by simply removing the belt and reversing the same, and by transferring the hopper together with its rear apron to the opposite side of the standard 10, the direction of rotation of the gearing may be reversed, and what is, in the illustrated form of the invention, the rear of the machine may be made the front of the same. It will be noted that the connections of the apron, the hopper, boot and the belt to the frame permit this reversal of parts to be readily made, it being possible to make such rearrangement without in any way disturbing the driving mechanism of the machine.

I claim:

1. The combination with a machine for cutting green corn from the ear, of means for automatically feeding the ears of corn to the cutting machine, said means comprising a hopper adapted to contain the ears of corn in bulk, a traveling conveyor adapted to remove automatically and singly ears from the hopper, and means to prevent the conveyor from permanently removing from the hopper more than a single ear at a time, whereby the ears are arranged on the conveyor singly in succession and are delivered to the cutting machine in this order.

2. The combination with a machine for cutting corn and the like, of means for automatically feeding the ears of corn to the cutting machine, and means for throwing out of operation said feeding means under defective operating conditions of the cutting machine.

3. The combination with a machine for cutting corn and the like, of means for automatically feeding the ears of corn to the cutting machine, and means for maintaining a fixed ratio between the speed of the cutting machine and the speed of the feeding means and for varying the speed of the feeding means in accordance with variations in the speed of the cutting machine.

4. The combination with a machine for cutting corn and the like, of means for automatically feeding the ears of corn to the cutting machine, means for maintaining a fixed ratio between the speed of the cutting machine and the speed of the feeding means and for varying the speed of the feeding means in accordance with variations in the speed of the cutting machine, and means for stopping said feeding means under defective operating conditions of the cutting machine.

5. A machine for feeding ears of corn and the like, comprising a hopper adapted to contain ears of corn in bulk, a traveling conveyor adapted to carry the ears of corn singly in succession thereon and adapted automatically to remove the ears singly from the hopper, and means for preventing the conveyor from permanently removing from the hopper more than one ear at a time, whereby the ears are arranged upon the conveyor singly in succession and are in this manner fed.

6. A machine for feeding ears of corn, comprising a hopper adapted to contain the ears of corn in bulk, a traveling conveyor adapted to carry the ears singly in succession and to remove the ears singly from the hopper, a second conveyor adapted to receive the corn from said first mentioned conveyor and to feed the same endwise, and means for preventing said first mentioned conveyor from permanently removing more than one ear of corn from the hopper at a time, whereby the ears are arranged upon the conveyor singly in succession and are, in this manner, delivered to the second conveyor.

7. A machine for feeding ears of corn and the like, comprising a hopper adapted to contain ears of corn in bulk, a traveling conveyor adapted automatically to remove the ears singly from said hopper, a second conveyor adapted to receive the ears singly from said traveling conveyor and to impart to them endwise movement, and transfer means adapted to move the ears from said endless conveyor to said second mentioned conveyor.

8. A machine as specified in claim 7, said second mentioned conveyor comprising a plurality of rotatable conveyor members adapted to receive the ears between them and to impart movement to the ears in substantial parallelism with the axes of said members.

9. A machine for feeding ears of corn and the like comprising a hopper for ears of corn, and means for automatically moving the ears from the hopper and feeding the same endwise, said means comprising a plurality of rotatable members spaced to receive the ears between them, said members being relatively movable apart to conform to the size of the ears, and means for rotating at least one of said members to impart an endwise movement to the ears substantially parallel to the axes of said members.

10. A machine for feeding ears of corn and the like, comprising a hopper adapted to contain ears of corn in bulk, an endless flight conveyor adapted automatically and singly to remove ears from the hopper, and a second conveyor within the path of travel of said endless conveyor adapted to receive the ears from said endless conveyor and to feed the ears endwise.

11. A machine for feeding ears of corn and the like, comprising a hopper adapted to contain ears of corn in bulk, an endless flight conveyor adapted to automatically and singly remove ears from the hopper and carry them singly between its flights, a second conveyor within the path of travel of said endless conveyor adapted to receive the ears from said endless conveyor and to feed the ears endwise, and transfer means adjacent said second conveyor adapted to discharge the ears singly from said endless conveyor into said second conveyor.

12. A machine for feeding ears of corn and the like comprising a hopper for ears of corn, a conveyor for automatically removing ears from the hopper, and a second conveyor to receive the ears from said first mentioned conveyor and adapted to feed the ears endwise, said second conveyor comprising a plurality of spaced rotatable members adapted to receive between them the ears and movable apart to conform to the cross sectional size of the ears, said second conveyor moving the ears in substantial parallelism with the axes of said rotatable members and means for moving each of said conveyors.

13. A machine for feeding ears of corn and the like comprising a hopper for ears of corn and means for automatically removing the ears from the hopper and feeding the same, said means comprising a conveyor adapted to engage the ears and to impart to them a feeding movement relatively to the conveyor, said conveyor being automatically adjustable upon receipt of an ear to conform to the cross sectional size of the ear.

14. A machine for feeding ears of corn and the like comprising a hopper for ears of corn and means for automatically removing the ears from the hopper and feeding the same, said means comprising a conveyor adapted to engage the ears and to impart to them an endwise feeding movement relatively to the conveyor, said conveyor being automatically adjustable upon receipt of an ear to conform to the cross sectional size of the ear.

15. A machine for feeding ears of corn and the like comprising a hopper for the ears of corn, a conveyor for automatically removing the ears from the hopper, a second conveyor for receiving the corn from the first mentioned conveyor and comprising a plurality of spaced rotatable rollers yieldingly movable apart to conform to the cross sectional size of the ears and adapted to impart to the ears a feeding movement relatively to the conveyor; and means for imparting a rotary movement to at least one of said rotatable members and to said first mentioned conveyor.

16. A machine for feeding ears of corn and the like comprising a hopper for the ears of corn, an endless conveyor for automatically removing the ears from the hopper, a second conveyor for receiving the corn from the first mentioned conveyor and comprising a plurality of spaced rotatable rollers yieldingly movable apart to conform to the cross sectional size of the ears and adapted to impart to the ears a feeding movement relatively to the conveyor; and means for imparting a rotary movement to at least one of said rotatable members and to said first mentioned conveyor.

17. A machine for feeding ears of corn and the like comprising a hopper adapted to contain ears of corn in bulk, means for automatically conveying the ears from the hopper to an operating machine, said means comprising a plurality of spaced rotatable rolls, each having a peripheral spiral conveying rib, said rolls being relatively movable apart and arranged to receive between them an ear of corn, and means for rotating at least one of said rolls to impart an endwise movement to the ear.

18. A machine for feeding ears of corn and the like comprising a hopper, means for automatically conveying the ears from the hopper to a machine intended to operate upon the ears, said means comprising a plurality of spaced rotatable rolls, each having a peripheral spiral conveying rib, arranged to receive between them an ear of corn, said rolls being movable apart to conform to the cross sectional size of the ear, and means for rotating at least one of said rolls to impart and endwise movement to the ear.

19. A machine for feeding ears of corn and the like comprising a hopper, an endless open conveyor having a plurality of flights each adapted to remove a single ear from the hopper and to positively maintain the ears separated thereon, a second conveyor for receiving the ears from said first mentioned conveyor and adapted to impart an endwise feeding movement to the ears, said second conveyor comprising a plurality of members adapted to yieldingly grip the ear and to be moved apart to receive the ear, and means for moving each of said conveyors.

20. A machine for feeding ears of corn and the like comprising a hopper, and endless open conveyor having a plurality of flights each adapted to remove a single ear from the hopper and to positively maintain the ears separated thereon, the ears of corn being arranged on the conveyor singly in succession, a second conveyor for receiving the ears from said first mentioned conveyor and adapted to impart an endwise feeding movement to the ears, said second conveyor comprising a plurality of members adapted to yieldingly grip the ear and to be moved apart to receive the ear, means for transferring the ears from the first conveyor to the second conveyor, and means for moving each of said conveyors.

21. A machine of the class described comprising a hopper, an endless conveyor passing through said hopper and having a plurality of flights each adapted to take up automatically from the hopper an ear of corn, a second conveyor adapted to receive the ears from said first mentioned conveyor and to feed the same into a second machine, said second conveyor comprising a plurality of spaced rotatable rollers, provided with peripheral spiral ribs and spaced to receive the ears of corn between them, said rollers being relatively movable apart to conform to the cross-sectional size of the ears; and means for operating said conveyors.

22. A machine of the class described comprising a hopper, an endless conveyor passing through said hopper and having a plurality of flights each adapted to take up automatically from the hopper an ear of corn, means for preventing the removal of more than a single ear by each flight, a second conveyor adapted to receive the ears from said first mentioned conveyor and to feed the same into a second machine, said second conveyor comprising a plurality of spaced rotatable rollers, provided with peripheral spiral ribs and spaced to receive the ears of corn between them, said rollers being relatively movable apart to conform to the cross-sectional size of the ears; and means for operating said conveyors.

23. A machine of the class described comprising a hopper, an endless conveyor passing through said hopper and having a plurality of flights each adapted to take up automatically from the hopper an ear of corn, means for preventing the removal of more than a single ear by each flight, a second conveyor adapted to receive the ears from said first mentioned conveyor and to feed the same into a second machine, said second conveyor comprising a plurality of spaced rotatable rollers, provided with peripheral spiral ribs and spaced to receive the ears of corn between them, said rollers being relatively movable apart to conform to the cross-sectional size of the ears; means for removing the ears from the first conveyor and placing them upon said second conveyor, and means for operating said conveyors.

24. A machine of the class described comprising a hopper, an endless conveyor having a substantially vertically moving portion passing through said hopper and having a plurality of flights each adapted to take up automatically from the hopper an ear of corn, said conveyor having a substantially horizontally moving portion, means for preventing the removal of more than a single ear by each flight, a second conveyor adjacent said horizontally moving portion of the first mentioned conveyor adapted to receive the ears from said first mentioned conveyor and to feed the same into a second machine, said second conveyor comprising a plurality of spaced rotatable rollers, provided with peripheral spiral ribs and spaced to receive the ears of corn between them, said rollers being relatively movable apart to conform to the cross-sectional size of the ears; and means for operating said conveyors.

25. A machine of the class described comprising a hopper, an endless conveyor having a substantially vertically moving portion passing through said hopper and having a plurality of flights each adapted to take up automatically from the hopper an ear of corn, said conveyor having a substantially horizontally moving portion, means for preventing the removal of more than a single ear by each flight, a second conveyor adjacent said horizontally moving portion of the first mentioned conveyor and within said first mentioned conveyor adapted to receive the ears from said first mentioned conveyor and to feed the same into a second machine, said second conveyor comprising a plurality of spaced rotatable rollers, provided with peripheral spiral ribs and spaced to receive the ears of corn between them, said rollers being relatively movable apart to conform to the cross-sectional size of the ears; and means for operating said conveyor.

26. In a device of the class described, means for feeding an ear of corn or the like comprising an open ended trough shaped conveyor formed of a plurality of spaced rollers adapted to receive between them and to yieldingly engage an ear of corn, said rollers being relatively movable apart by an ear of corn to conform to the cross-sectional size of the ear, and means for rotating said rollers.

27. In a device of the class described, means for feeding an ear of corn or the like comprising an open ended trough shaped conveyor formed of a plurality of spaced rollers adapted to receive between them and to yieldingly engage an ear of corn, said rollers being relatively movable apart by an ear of corn to conform to the cross-sectional size of the ear, means for automatically depositing ears of corn in said conveyor, and means for rotating said rollers.

28. In a device of the class described, means for feeding an ear of corn or the like comprising an open ended trough shaped conveyor formed of a plurality of spaced rollers adapted to receive between them and to yieldingly engage an ear of corn, said rollers being relatively movable apart by an ear of corn to conform to the cross-sectional size of the ear, means for automatically depositing ears of corn in said conveyor comprising a rotatable wheel having a plurality of yielding presser bars, and means for rotating said rollers.

29. In a device of the class described, means for feeding an ear of corn or the like comprising an open ended trough shaped conveyor formed of a plurality of spaced rollers adapted to receive between them and to yieldingly engage an ear of corn, said rollers being relatively movable apart by an ear of corn to conform to the cross-sectional size of the ear, at least one roller having a pivotal movement away from the other rollers, and means for rotating said rollers.

30. In a machine for feeding ears of corn and the like, a hopper adapted to contain ears of corn in bulk, an endless conveyor having a path of travel adjacent said hopper and adapted to automatically remove ears of corn singly from the hopper, a second conveyor adapted to receive the ears singly from the first conveyor and to feed the ears into a cutting machine, means for removing the ears from the first conveyor and depositing them into the second conveyor, and means for operating said conveyors.

31. In a machine for feeding ears of corn and the like, a hopper, an endless conveyor having a path of travel adjacent said hopper and adapted to automatically remove ears of corn singly from the hopper, said conveyor having a plurality of flights each adapted to pick up a single ear of corn, means to prevent the conveyor from removing more than a single ear at a time, a second conveyor adapted to receive the ears singly from the first conveyor and to feed the ears into a cutting machine, means for removing the ears from the first conveyor and depositing them into the second conveyor, and means for operating said conveyors.

32. In a machine for feeding ears of corn and the like, a hopper, an endless conveyor having a path of travel adjacent said hopper and adapted to automatically remove ears of corn singly from the hopper, said conveyor having a plurality of flights each adapted to pick up a single ear of corn, means to prevent the conveyor from removing more than a single ear at a time, a second conveyor within the path of travel of said first mentioned conveyor and adapted to receive the ears singly from the first conveyor and to feed the ears into a cutting machine, means for removing the ears from the first conveyor and depositing them into the second conveyor, and means for operating said conveyors.

33. In a machine for feeding ears of corn and the like, a hopper, an endless conveyor having a path of travel adjacent said hopper and adapted to automatically remove ears of corn singly from the hopper, said conveyor having a plurality of flights each adapted to pick up a single ear of corn, means to prevent the conveyor from removing more than a single ear at a time, a second conveyor within the path of travel of said first mentioned conveyor and adapted to receive the ears singly from the first conveyor and to feed the ears endwise into a cutting machine, means for removing the ears from the first conveyor and depositing them into the second conveyor, and means for operating said conveyors.

34. In a machine for feeding ears of corn and the like, a hopper, an endless conveyor having a path of travel adjacent said hopper and adapted to automatically remove ears of corn singly from the hopper, said conveyor having a plurality of flights each adapted to pick up a single ear of corn, means to prevent the conveyor from removing more than a single ear at a time, a second conveyor within the path of travel of said first mentioned conveyor and adapted to receive the ears singly from the first conveyor and to feed the ears endwise into a cutting machine, means for removing the ears from the first conveyor and depositing them into the second conveyor, said second conveyor comprising a plurality of rotatable members mounted upon axes pivotally movable apart to conform to the cross-sectional size of the ears, and means for operating said conveyors.

35. The combination with a machine for cutting corn from the cob, of means for automatically feeding the ears of corn to the cutting machine, said means comprising a hopper adapted to contain the ears of corn in bulk, a traveling conveyor for removing the ears singly from the hopper, and knock-off means for removing from said conveyor any surplus ears should more than one ear be removed from the hopper at a time.

36. A machine for feeding ears of corn and the like, comprising a hopper adapted to contain ears of corn in bulk, a traveling conveyor for automatically removing the ears singly from the hopper, and means in the path of said conveyor for dislodging therefrom surplus ears should more than one ear be removed at a time from said hopper.

37. A machine for feeding ears of corn and the like, comprising a hopper adapted to contain ears of corn in bulk, a traveling conveyor adapted automatically to remove the ears singly from the hopper, knock-off means in the path of said conveyor adapted to dislodge from the conveyor surplus ears should more than one ear of corn be removed from the hopper at a time, and a second conveyor adapted to receive the corn from said first mentioned conveyor and to feed the same endwise.

38. A machine as specified in claim 19, having means for transferring the ears singly from the endless conveyor to said second conveyor.

39. A machine as specified in claim 19, having means for transferring the ears singly from the endless conveyor to said second conveyor, said means forcing the ears between said yielding members and thereby urging the members apart to receive the ears.

40. The combination with a machine for cutting green corn from the ear, of a hopper adapted to contain the ears of corn in bulk, conveying means for automatically removing the ears of corn singly from the hopper and feeding the same endwise singly in succession to the cutting machine, and means for preventing the permanent withdrawal from the hopper by the conveying means of more than one ear of corn at a time, whereby the ears are fed to the cutting machine by the conveying means singly in succession.

In testimony whereof I have hereunto set my hand.

ANDREW F. STERNAD.